Aug. 18, 1970  HANS JOACHIM WITTEMEIER ET AL  3,524,304
BAG AIR-FILTER
Filed May 29, 1967  2 Sheets-Sheet 1
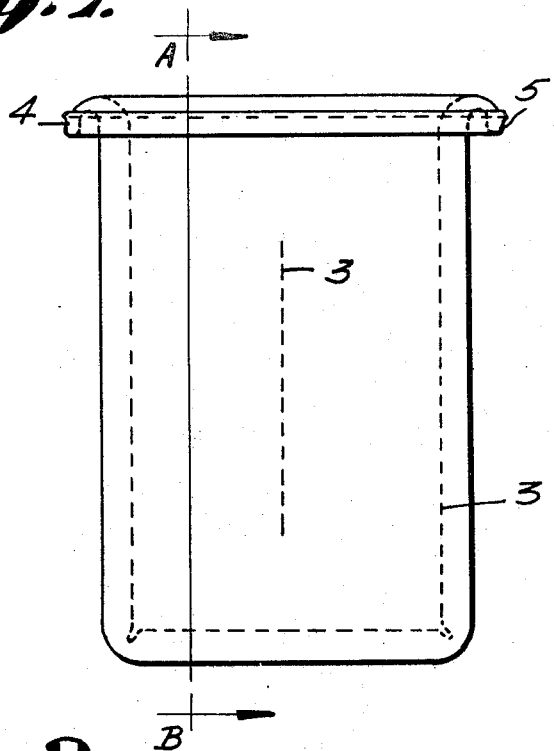
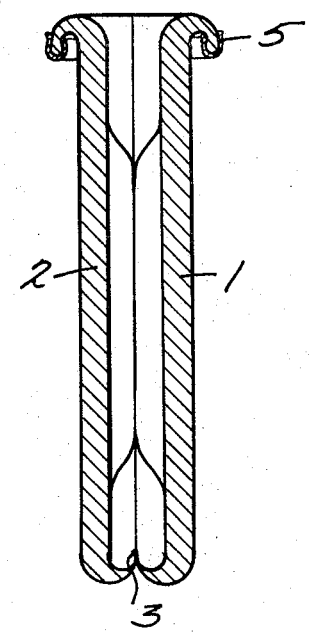
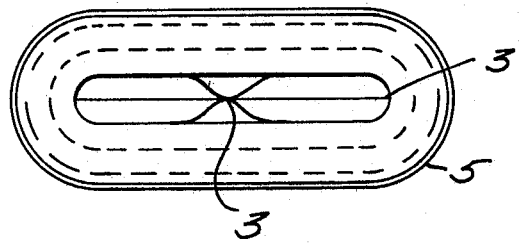
INVENTORS
HANS JOACHIM WITTEMEIER
BY FRITZ BECKER
KLAUS PETER DEUTSCHMANN
Cushman, Darby & Cushman
ATTORNEYS

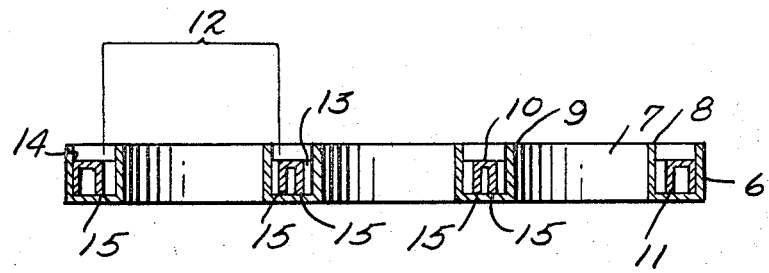
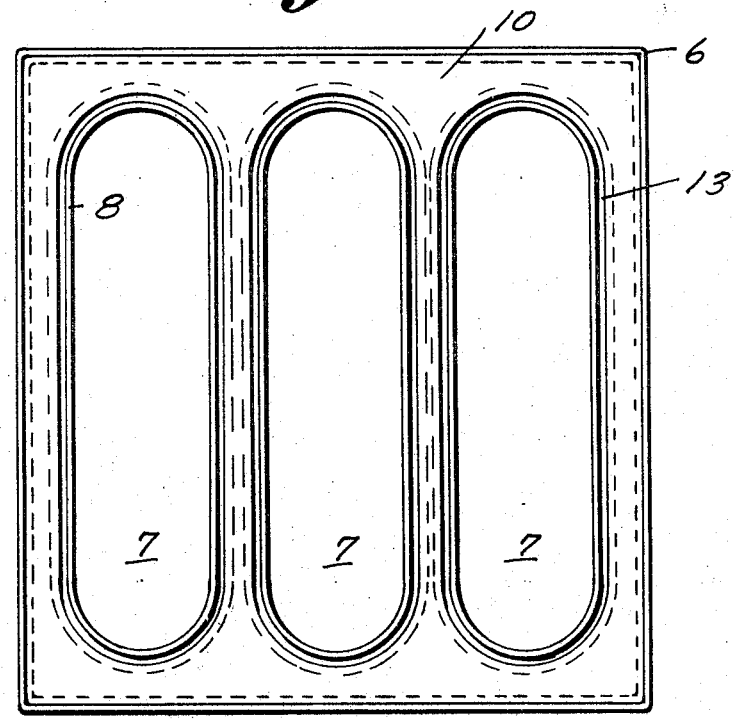

United States Patent Office 3,524,304
Patented Aug. 18, 1970

3,524,304
BAG AIR-FILTER
Hans Joachim Wittemeier, Fritz Becker, and Klaus Peter Deutschmann, Berlin, Germany, assignors to Delbag-Luftfilter G.m.b.H., Berlin, Germany
Filed May 29, 1967, Ser. No. 642,087
Claims priority, application Germany, May 28, 1966, D 33,517
Int. Cl. B01d 46/02
U.S. Cl. 55—374
6 Claims

ABSTRACT OF THE DISCLOSURE

A bag air-filter comprising at least one and preferably a plurality of filter bags and a receptor plate therefor, said bag or each bag having a channel-shaped stiff rim and said receptor plate having at least one and preferably a plurality of openings surrounded or each surrounded by a collar, said bag or each bag being removably suspended by the said rim on the said collar.

There is a retaining plate having at least one opening larger than that in the said receptor plate and surrounded by a collar of less depth than the collar on the said receptor plate and co-operating with the receptor plate to retain the bag rim, there being preferably a plurality of said openings in the retaining plate.

The upper margin at the open end of the bag is folded over and a U-shaped edging is secured thereto, which edging may be of a synthetic plastics or rubber material; or alternatively the channel-shaped stiff rim of the bag is moulded with the aid of a synthetic rubber or plastics material.

---

The invention relates to a bag air-filter in which the air-filter media in the form of bags are fixed in receptor plates. In the known arrangements of this kind, a relatively large effective filter surface can be accommodated on a comparatively small flow section. This is particularly important in air-filters for fine dust and suspended matter separation, since the air-filter media suitable therefor can be loaded at only relatively low transit speeds. These permissible transit speeds amount in general to only a fraction of the air speed in normal air conduits.

In air-filters for fine dust and suspended matter separation, it is important to achieve adequate sealing between the filter medium and the mounting frame. It is therefore known, in bag air-filters, to achieve the sealing connexion between the filter bags and the receptor plate by means of adhesive. This has as a consequence that when changing dirty filter bags the receptor plate must be changed also, which means a significant expense. The receptor plates with the filter bags form clumsy units which complicate packing and transit. The adhesive connexion is vulnerable, particularly to bending, and, since bendings cannot be avoided, the sealing obtained by adhesive, good in itself, is open to question.

A known arrangement, in which the individual filter bags are to be fixed exchangeably in a receptor plate, avoids these disadvantages. The filter bags are fixed to flanges and, for mounting the bags, press buttons with tapes are consequently necessary. The fixing of the individual bags by means of the press buttons mounted on tapes is troublesome and time-consuming, which, in large installations, is of particularly great importance.

The aim of the invention is to avoid these disadvantages of known arrangements and to provide a bag air-filter which needs no special auxiliaries such as adhesive, buttoning or cementing for fixing the bags.

To this end, according to the present invention, the bag openings of the receptor plate are surrounded by collars on which the filter bags, which are provided with channel-shaped e.g. folded over and stiffened rims, are suspended by said rims. For securing the said rims of the bags, a retaining plate is provided, the openings of which are larger and the collars of which are of less depth than those of the receptor plate, and whereby grooves are formed round about the collars of the receptor plate. The folded-over rims of the filter bags are fixed in the grooves and thus a bag is prevented from being withdrawn from its mounting.

The folded-over upper rim of a bag is, for stiffening purposes, advantageously stapled, sewn or stuck into an edging of U-shaped cross-section.

The individual bags are exchangeable and no special precautions are needed for sealing insertion. The stiffened rims are merely pushed into the grooves formed around the openings of the receptor plate.

In the drawings, a preferred embodiment of the innovation is represented as an example.

FIG. 1 is an elevation,
FIG. 2 is a plan, and
FIG. 3 is a section along the line A–B of FIG. 1 of a filter bag,
FIG. 4 is a plan, and
FIG. 5 a vertical longitudinal section of the receptor plate with a retaining plate inserted.

The filter bags consist, as may be seen from FIGS. 1–3, of the sewn or stuck-together widths 1 and 2 made of a suitable filter medium, as for example glass or synthetic fibres. The seams are shown at 3 by broken lines. The upper open edge of the filter bag is—as designated at 4—folded over. The folded-over rim is stiffened. In the chosen example, an edging 5 of U-shaped cross-section is provided made of synthetic material, and the folded-over rim is stuck in this edging. It can also be stapled or sewn therein and it is further possible to use other sorts of stiffening, for example by impregnation with synthetic resin or the like. Likewise, instead of the folded-over rim, a moulded rim made of synthetic rubber with a groove can be provided.

For the mounting of the filter bags, a receptor plate 6 with bag openings 7 is provided. The openings 7 are surrounded by collars 8 which are preferably inclined slightly inwards. The filter bags are suspended on the collars by their stiffened folded rims 5. Sealing takes place automatically as soon as the pressure difference on the filter bag with through-flowing air comes into effect, and, of course the sealing takes place between the soft filter medium and the sharp edge 9 of the collar 8.

In order to prevent the filter bag being pulled downwards from the collar 8, a locking plate 10 is provided. The locking plate resembles the receptor plate 6 but has collars 11 of lesser height and forming greater openings 12 than the collars 8. Applied reciprocally in the receptor plate 6, it provides peripheral grooves 13 in which are located the stiffened folded rims 4–5 of the filter bags. (In FIGS. 4 and 5 the bags are omitted for the sake of clarity.) The grooves 13 prevent the folded rims from unfolding upwards and thus releasing the filter bag. The locking plate 10, as indicated at 14, is stuck peripherally to the receptor plate 6. Adhesive connection of all contact surfaces at 15 is also advisable. In this way, receptor plate 6 and locking plate 10 provide also a mechanically stiffened frame.

The plates can be made of synthetic plastic or metallic materials.

It is also possible to dispense with a locking plate if the collars are placed so close together that there is a groove between them in which the stiffened folded rims of two adjacent bags support one another reciprocally and thus prevent unfolding upwards.

The changing of the filter bags is simple and quickly carried out without special precautions. The transport and storage of replacement filter bags is simple and takes little space because the frames consisting of receptor plate and locking plate remain in the filter installation and are not changed. The arrangement according to the invention is not expensive because the frames represent a once-for-all expenditure.

What is claimed is:

1. A bag air-filter apparatus comprising a plurality of filter bags; a horizontally extending receptor plate for receiving and supporting said filter bags; said receptor plate having upper and lower surfaces; said receptor plate having a plurality of elongated spaced apart openings therethrough; a plurality of upstanding, annular, continuous, spaced apart, first collars; each of said collars having an upper and a lower end; each of said collars being attached at its lower end to said upper surface of said plate in surrounding relationship to a respective one of said openings; the circumference around the lower end of each of said collars respectively being greater than the circumference around the upper end of each of said respective collars for imparting a slightly inwardly inclined frustum like configuration to each respective one of said collars; each of said collars being of substantially the same height; each said bag extending through a respective one of said openings and its respectively associated collar; each said bag having an open upper end disposed above said upper surface and a closed lower end disposed below said lower surface; each said bag having its respective upper end portion folded over outwardly and forming an inverted, U-shaped, open channel-shaped rim; each bag disposed with a respective one of said collars received in said rim with the upper edge of each respective collar extending between the legs of and engaging in sealing relationship the base of the respective U-shaped rim with the lower edge of the folded over portion encircling and engaging the lower end of the respective collar; the lower folded over portion of each respective bag having an edging of U-shaped cross-section attached thereto which stiffens the rim; a locking plate having a plurality of spaced apart apertures therethrough; a plurality of annular, continuous, upstanding, spaced apart, locking, second collars attached to said locking plate; one each of said locking collars surrounding a respective opening in said locking plate; said locking plate disposed above and on said receptor plate with each aperture and its associated locking second collar surrounding and spaced apart from a respective one of said first collars; said locking plate and each said second collar and each said first collar defining therebetween a continuous annular space thereby defining a plurality of annular spaces; said edging of a respective bag being disposed in, fixed in, and received in a respective one of said annular spaces to prevent the respective bag from being withdrawn from its mounted position during normal filtering operation of the apparatus; said second collars each of said first collars, and said locking plate being secured to and connected to said receptor plate with the top of each said second collar being disposed below the top of each said first collar.

2. An apparatus as defined in claim 1 wherein said locking plate is stuck peripherally to said receptor plate.

3. An apparatus as defined in claim 1 wherein all surfaces of said locking plate which are in contact with said receptor plate are adhesively secured to said receptor plate to provide a mechanically stiffened means to support the filter bags.

4. An apparatus as defined in claim 1 wherein each filter bag has a seam extending in a vertically extending line midway between the sides of the bag; said seam terminating at an upper end at a point below the top of the bag and a lower end above the bottom of the bag.

5. An apparatus as defined in claim 1 in which said bags are composed of glass fibers.

6. A bag air-filter according to claim 1 in which the said U-shaped edging is of a synthetic plastic or rubber material.

References Cited

UNITED STATES PATENTS

| 1,038,223 | 9/1912 | Smith | 55—378 X |
| 2,467,503 | 4/1949 | Scriven | 55—377 X |
| 2,853,154 | 9/1958 | Rivers | 55—376 X |
| 2,954,873 | 10/1960 | Davis | 210—333 |
| 3,159,862 | 12/1964 | MacFarland. | |

FOREIGN PATENTS

| 113,704 | 8/1941 | Australia. |
| 555,056 | 8/1943 | Great Britain. |
| 879,781 | 10/1961 | Great Britain. |

DENNIS E. TALBERT, Jr, Primary Examiner

U.S. Cl. X.R.

55—341, 378, 381, 483, 484, 502, 511